(12) United States Patent
Ache et al.

(10) Patent No.: US 8,336,090 B2
(45) Date of Patent: Dec. 18, 2012

(54) SYSTEM AND METHOD FOR UNLIMITED LICENSING TO A FIXED NUMBER OF DEVICES

(75) Inventors: Marc Ache, Long Island City, NY (US); William E. Pence, New York, NY (US)

(73) Assignee: Rhapsody International Inc., Seattle, WA (US)

( * ) Notice: Subject to any disclaimer, the term of this patent is extended or adjusted under 35 U.S.C. 154(b) by 917 days.

(21) Appl. No.: 12/020,420

(22) Filed: Jan. 25, 2008

(65) Prior Publication Data
US 2008/0134312 A1 Jun. 5, 2008

Related U.S. Application Data

(63) Continuation of application No. 11/137,347, filed on May 24, 2005, now abandoned.

(51) Int. Cl.
*G06F 7/04* (2006.01)
*G06F 15/16* (2006.01)

(52) U.S. Cl. ........... 726/9; 726/5; 726/18; 726/29; 713/189; 713/182; 705/75

(58) Field of Classification Search ......... 713/154–159, 713/172; 726/5–9
See application file for complete search history.

(56) References Cited

U.S. PATENT DOCUMENTS

| | | | |
|---|---|---|---|
| 6,709,333 B1 * | 3/2004 | Bradford et al. | 463/29 |
| 7,010,808 B1 * | 3/2006 | Leung et al. | 726/26 |
| 7,065,787 B2 * | 6/2006 | Ganesan et al. | 726/21 |
| 7,225,333 B2 * | 5/2007 | Peinado et al. | 713/164 |
| 7,322,043 B2 * | 1/2008 | Letsinger | 726/19 |
| 7,383,438 B2 * | 6/2008 | Fahrny et al. | 713/169 |
| 7,496,540 B2 * | 2/2009 | Irwin et al. | 705/59 |
| 7,644,044 B2 * | 1/2010 | Candelore | 705/57 |
| 7,672,662 B2 * | 3/2010 | Hamberg | 455/411 |

(Continued)

FOREIGN PATENT DOCUMENTS
WO 02/097693 12/2002

OTHER PUBLICATIONS

Esckicloglu AM, Protecting Intellectual Property in Digital Multimedia networkds, Jul. 2003, IEEE, vol. 36 / 7, pp. 42-44.*

*Primary Examiner* — Nathan Flynn
*Assistant Examiner* — Viral Lakhia
(74) *Attorney, Agent, or Firm* — K&L Gates LLP (57) ABSTRACT

A method and system providing access to electronic content includes receiving a request to access the electronic content from a user device, accessing a unique ID of the user device, and comparing the unique ID to a list of authorized user devices. The unique ID is used to determine if the user device is an authorized user device. If the user device is authorized, access is provided to the electronic content. If the user device is not authorized, determining if a maximum number of authorized user devices is reached. The user device is converted to an authorized user device, if the maximum number is not reached. If the maximum number of authorized user devices is reached, the user can be denied access to the electronic content or the system can request de-authorization of one of the authorized user devices to convert the user device to an authorized user device.

13 Claims, 5 Drawing Sheets

U.S. PATENT DOCUMENTS

| | | |
|---|---|---|
| 7,802,109 B2 * | 9/2010 | Gouguenheim et al. ...... 713/193 |
| 8,205,266 B2 * | 6/2012 | Pfitzmann et al. ............. 726/27 |
| 2003/0084306 A1 * | 5/2003 | Abburi et al. ................. 713/188 |
| 2004/0039916 A1 * | 2/2004 | Aldis et al. ................... 713/177 |
| 2004/0158709 A1 | 8/2004 | Narin et al. |
| 2005/0044016 A1 * | 2/2005 | Irwin et al. ...................... 705/30 |
| 2005/0065891 A1 * | 3/2005 | Lee et al. ........................ 705/59 |
| 2005/0091507 A1 * | 4/2005 | Lee et al. ..................... 713/182 |
| 2005/0102240 A1 * | 5/2005 | Misra et al. ..................... 705/59 |
| 2006/0010074 A1 * | 1/2006 | Zeitsiff et al. ................... 705/52 |
| 2006/0015580 A1 * | 1/2006 | Gabriel et al. ................ 709/219 |
| 2006/0036554 A1 * | 2/2006 | Schrock et al. ................. 705/75 |
| 2008/0082813 A1 * | 4/2008 | Chow et al. ...................... 713/2 |
| 2008/0235805 A1 * | 9/2008 | Pfitzmann et al. ............. 726/27 |
| 2009/0049556 A1 * | 2/2009 | Vrielink et al. ................. 726/26 |
| 2009/0175442 A1 * | 7/2009 | Feng et al. ...................... 380/28 |

* cited by examiner

| User ID | Unique ID | Authorized Date | Brand Name |
|---|---|---|---|
| 1. User 1 | 123456789 | Feb. 5, 2005 | iPod™ |
| 2. User 1 | ABCDEFGHI | Feb. 15, 2005 | Samsung™ |
| 3. User 1 | ABCDE6789 | Feb. 25, 2005 | Rio™ |
| ⋮ | ⋮ | ⋮ | ⋮ |
| N. User 1 | 12345FGHIJ | March 3, 2005 | Zen™ |

Maximum Number of Authorized Devices has been Reached

Current Device is not Authorized. Please Select Device to De-Authorize

Fig. 3

SYSTEM AND METHOD FOR UNLIMITED LICENSING TO A FIXED NUMBER OF DEVICES

This application is a continuation of U.S. patent application Ser. No. 11/137,347, filed May 24, 2005 which is incorporated herein in its entirety.

FIELD OF THE INVENTION

The present invention relates to a digital rights management (DRM) system and method that allows a fixed number of devices to be licensed by remembering the device and denying licensing to any device exceeding the fixed number.

BACKGROUND OF THE INVENTION

A typical DRM licensing system uses tokens to protect distributed electronic content. The token contains the information pertaining to the at least the rights the user is allowed to exercise regarding the content. Typically, a token is generated and passed to the user device rendering the electronic content. In a subscription based licensing system, the token is renewed periodically to allow the user continued access to the electronic content. When the user's subscription lapse, the token is not renewed and the user is denied access to the electronic content.

The benefit of a subscription based DRM system is that the user can have unlimited access to some or all of a provider's catalogue of electronic content for a fixed subscription rate. Typically, the user can only receive the subscription based content on a fixed number of devices. For example, the user can only use three different desktops and/or handheld players (e.g. MP3 players). Prior art DRM systems receive a request from a user to access content on a first device, the DRM system passes the token to the first device and increments a counter (either reduced from the fixed number or counts up from zero) and the first device is now an authorized device. When the user requests a download to a subsequent device, the token is passed and the counter is likewise incremented until the maximum number of authorized devices is reached. Once the maximum number is reached, any further requests for access by a user are denied. The user can continuously request and be granted access to electronic content on any authorized device because the DRM system checks for the presence of the token, and once confirmed, allows access to the requested electronic content.

However, the prior art DRM system does not track the authorized devices. The system only tracks the number of requests and the presence of tokens. This causes a problem when the token on the authorized device is erased. Typically, the token is hidden and transparent to the user to avoid tampering and/or erasure by the user. However, if the user reformats the memory on the authorized device, the token is erased. After formatting, when the user requests access to the content, the prior art DRM system checks the authorized device for a token and determines that one is not present and thus does not consider it an authorized device. The system then looks to the counter and determines that the user has, in this example, reached the maximum number of authorized devices, and does not allow access to the content. However, access to the content should be allowed because this is not an additional device, but an authorized device. The user then must request assistance to fix the problem. This is frustrating to a user, especially if the same authorized device is continuously reformatted, which is a frequent occurrence with some handheld devices, and then "re-licensed" until the maximum number of authorized devices is reached.

Thus, it is an object of the present invention to allow users access to content on their authorized devices even if the authorizing token is erased. Further, it is an object of the invention to allow the access to the authorized devices and still maintain the limit of the maximum number of devices.

SUMMARY OF THE INVENTION

A user has one or more user devices for rendering electronic content. Electronic content can be audio, video, still images, text, data, and software or any combination thereof. User devices can be any device than can render the electronic content, including computers, laptops, PDAs, cellular telephones, pagers, Blackberries®, handheld players, including MP3 and video players, stereos, DVD players, DVRs, and portable entertainment systems. The devices can be Janus® enabled. Each user device can have a unique ID that identifies the user device.

A licensing server can contain all or part of a DRM system to manage electronic content for a provider and is connected to the user device over a network. The user devices can connect directly to the licensing server, or connect through a portal device that the user device is linked to. Licensing server controls the user's access to the electronic content and can determine how many user devices are authorized user devices. Authorized user devices are user devices that are registered with the licensing server and are permitted to access the electronic content. In an embodiment, licensing server maintains an authorization database.

The authorization database can contain a list of a user IDs, unique to each user; the unique ID; an authorization date, which is the time or date the user device became an authorized user device; and a make/model/brand name of the user device.

Every user has a maximum number of user devices that can be considered authorized user devices. Typically, the maximum number is set by the provider and can be a condition of the provider's agreement with the content owner. The user devices can become authorized user devices by being listed in the authorization database. The user device can be listed in the authorization database multiple ways. In an embodiment, user devices connected to the provider's system are queried for its unique ID and added to the authorization database. Alternately, only the user device that is requesting access to the electronic content is added to the authorization database. Further, the user can input the unique ID or initiate a request to make the user device an authorized user device.

Once the user requests access to the electronic content either the unique ID is passed to the licensing server with the request or the licensing server queries user device for its unique ID. The unique ID is compared to the unique IDs of the authorized user devices to determine if the requesting user device is an authorized user device. If the user device is authorized, the user is allowed access to the content.

If the user device is not an authorized user device, licensing server can have numerous options. In one embodiment, if a number of authorized user devices is not greater than or equal to the maximum number of authorized user devices, user device can be added to the authorization database and become an authorized user device. If adding the user device exceeds the maximum number of authorized user devices, the user's request for access to the electronic content can be denied.

Alternately, the user can be presented with a list of authorized user devices and the user can de-authorize one or more of the authorized user and permit the requesting user device to become an authorized user device. One embodiment can store all unique IDs for all user devices and indicate which user devices are authorized user devices. Alternately, only the authorized user devices are stored in the authorization database and de-authorized user devices are deleted. Another embodiment limits the number of de-authorizations in a certain time period.

The unique ID can be stored in a cookie on the user device or portal device and the cookie is accessed at the time of the request for the electronic content. Multiple cookies can be created, one for each user device or unique ID or multiple unique IDs can be stored in one cookie. In a further embodiment, only the unique ID of the last accessed user device can be stored in the cookie. Another embodiment encrypts the unique ID if it is stored outside user device, or it can be stored encrypted in the cookie.

In an alternate embodiment, the licensing server can provide a token in response to a user's request to access content. The token can be any identifier that, in one embodiment, contains usage rules for the electronic content and can allow access to the electronic content based on the usage rules and does not need to look elsewhere for rules or authorization. Without a valid token, the user cannot access the electronic content. The token can be linked to the user device and controls other tokens on the user device (e.g. a master token, root and leaf tokens) or can be an individual token to each individual piece of electronic content. Tokens can be delivered with the electronic content as it is being delivered to the user device.

Alternately, the token can be a pointer (e.g. a URL) to the licensing server. Once the user requests access to the electronic content, the URL is activated and the licensing server is queried to determine if the user is allowed access to the electronic content. In either embodiment, a token is present with the electronic content on the user device.

The user can request access to electronic content and the licensing server can determine if the user device has a token. Either the token can be passed up to the licensing server at the time of the request or the licensing server can query the user device to find the token. If the user device has a token, the user is granted access to the electronic content. If the user device does not have a token, the licensing server checks the authorization database. If the unique ID of the user device matches the unique ID of an authorized user device in the authorization database, the user is granted access to the electronic content. If the unique ID does not match, the license server determines if the maximum number of authorized user devices has been reached. If the maximum number has not been reached, the user device is added to the authorization database as an authorized user device and the user is granted access to the electronic content. If the maximum number has been reached, alternately, the user's request can be denied or the user can be prompted to de-authorize a user device and authorize the requesting user device so the user can gain access to the electronic content.

A method allows access to electronic content when the unique ID is stored in a cookie and the user makes a request for electronic content. The license server can check the cookie for the unique ID, and if the unique ID is not in the cookie, the user is denied access to the electronic content. If the unique ID exists, the unique ID is looked-up in the authorization database and, if present, the user is provided access to the electronic content. If the unique ID is not in the authorization database, the number of entries in the authorization database can be determined. If the number is less than the maximum number, the user device can be adding to the authorization database and permitting the user access to the electronic content. If the authorization database already contains the maximum number of authorized user devices, the user can be denied access to the electronic content or queried to de-authorize an authorized user device.

Another method includes receiving a request for access to the electronic content from a user device, accessing a unique ID of the user device, and comparing the unique ID to a list of authorized user devices. The unique ID is used to determine if the user device is an authorized user device and if the user device is authorized, access is provided to the electronic content. If the user device is not authorized, a determination is made if a maximum number of authorized user devices is reached. The user device is converted to an authorized user device, if the maximum number is not reached.

If the maximum number of authorized user devices is reached, the user can be denied access to the electronic content or the system can request de-authorization of one of the authorized user devices to convert the user device to an authorized user device

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENTS

Figure 1:
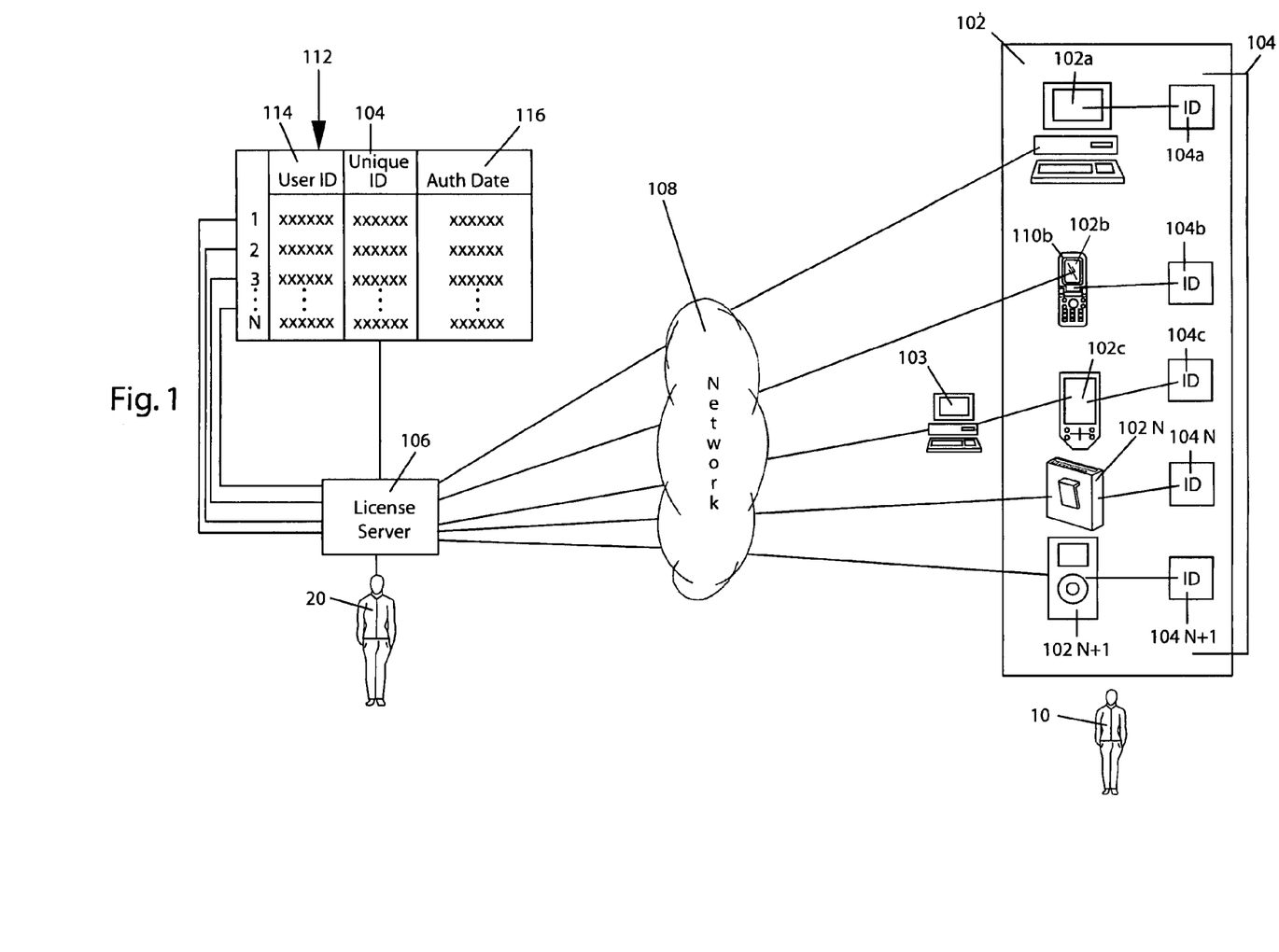
FIG. 1 is a diagram illustrating the system of the present invention.

FIG. 1 illustrates a system of the present invention. A user 10 has one user device 102 or more than one user device 102*a*, 102*b*, 102*c* ... 102$_N$, 102$_{N+1}$ for rendering electronic content. Electronic content can be audio, video, still images, text, data, and software or any combination thereof. User devices 102 can be any device than can render the electronic content, including computers, laptops, PDAs, cellular telephones, pagers, Blackberries®, handheld players, including MP3 and video players, stereos, DVD players, DVRs, and portable entertainment systems. The devices can be Janus® enabled.

Each user device 102 has a unique ID 104 that identifies the user device 102. The unique IDs 104*a*, 104*b*, 104*c* ... 104$_N$, 104$_{N+1}$ match user devices 102*a*, 102*b*, 102*c* ... 102$_N$, 102$_{N+1}$ respectively. Unique ID 104 can be a serial number or a canonical name, as long as the name is unique for each user device 102. A canonical name is a hardware identifier and is burned into the permanent memory of user device 102.

A licensing server 106 contains all or part of a DRM system to manage electronic content for a provider 20. Licensing server 106 can be distributed over one or more servers or duplicated on one or more servers to service regions of users 10. Licensing server 106 is connected to the user device 102 over a network 108. Network 108 can be a LAN, WAN, the Internet, or a wired, wireless, cellular or satellite network. User devices 102 can connect directly to the licensing server, or connect through a portal device 103 that the user device 102 is linked to. For example, a user 10 can have a desktop computer on the network and synchronizes an MP3 player (as the user device 102) to the desktop computer (as the portal device 103).

Licensing server 106 controls the user's 10 access to the electronic content and can determine how many user devices 102 are authorized user devices 110. Authorized user devices 110 are user devices 102 that are registered with the licensing server 106 and are permitted to access the electronic content. In an embodiment, licensing server 106 maintains an authorization database 112.

Figure 2:
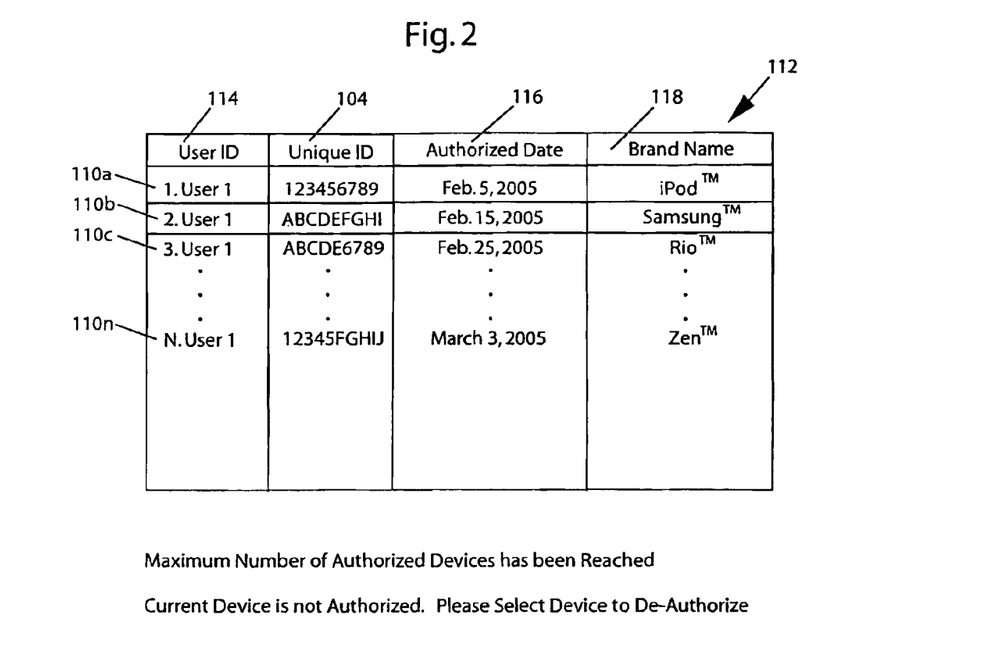
FIG. 2 is an illustration of a de-authorization screen of the present invention.

FIG. 2 illustrates an embodiment of the authorization database 112, which can contain a list of a user ID 114, unique to each user 10; the unique ID 104; an authorization date 116, which is the time or date the user device 102 became an authorized user device; and a make/model/brand name 118 of the user device 102.

Every user 10 has a maximum number N of user devices 102 that can be considered authorized user devices 110. Typically, the maximum number N is set by the provider 20 and can be a condition of the provider's agreement with the content owner. In an embodiment, the maximum number N of devices can be three.

User devices 102 can become authorized user devices 110 by being listed in the authorization database 112. User device 102 can be listed in the authorization database 112 multiple ways. In an embodiment, every user device 102 connected to the provider's system is queried for its unique ID 104 and added to the authorization database 112. Alternately, only the user device 104 that is requesting access to the electronic content is added to the authorization database 112. Further, the user 10 can input the unique ID 104 or initiate a request to make the user device 102 an authorized user device 110.

In one embodiment, user 10 requests access to the electronic content. Either the unique ID 104 is passed to the licensing server 106 with the request or the licensing server 106 queries user device 102 for its unique ID 104. Licensing server 106 accesses authorization database 112 and compares the unique ID 104 to the unique IDs 104 of the authorized user devices 110 to determine if the requesting user device 102 is an authorized user device 110. If the user device 102 is authorized, the user 10 is allowed access to the content.

If the user device 102 is not the authorized user device 110, licensing server 106 can have numerous options. In one embodiment, if a number of authorized user devices 110 is not greater than or equal to the maximum number N of authorized user devices 110, user device 102 can be added to the authorization database 112 and become an authorized user device 110. If adding the user device 102 exceeds the maximum number N of authorized user devices 110, the user's request for access to the electronic content can be denied.

Alternately, as illustrated in FIG. 2, the user 10 can be presented with a list of authorized user devices 110 and the user 10 can de-authorize one or more of the authorized user devices 110a, 110b, 110c . . . 110$_N$ and permit the requesting user device 102 to become an authorized user device 110. One embodiment can store all unique IDs 104 for all user devices 102 and indicate which user devices 102 are authorized user devices 110. Alternately, only the authorized user devices 110 are stored in the authorization database 112 and de-authorized user devices 102 are deleted. Another embodiment limits the number of de-authorizations in a certain time period. For example, user 10 can only de-authorize and replace one user device 102 per month.

In an embodiment, the unique ID 104 is stored in a cookie on the user device 102 and the cookie is accessed at the time of the request for the electronic content. Multiple cookies can be created, one for each user device 102 or unique ID 104 or multiple unique IDs 104 can be stored in one cookie. In a further embodiment, only the unique ID 104 of the last accessed user device 102 can be stored in the cookie. Another embodiment encrypts the unique ID 104 if it is stored outside user device 102, or it can be stored encrypted in the cookie. Furthermore, the portal device 103 can store the unique ID 104 or cookie for the user device 102 and the licensing server 106 queries the portal device 103 for the unique ID 104.

Figure 3:
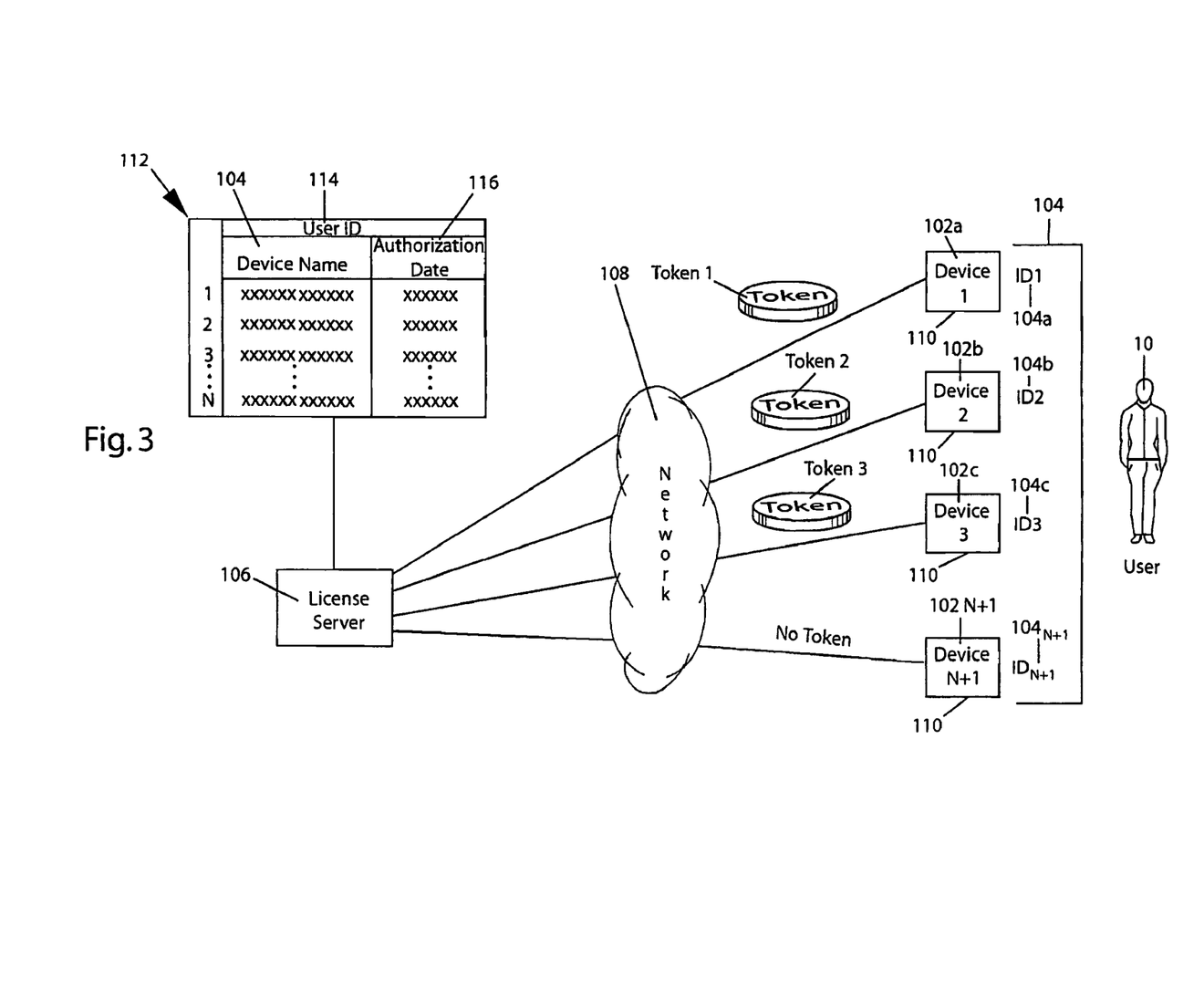
FIG. 3 is a diagram illustrating an embodiment of the system of the present invention.

Referring to FIG. 3, an alternate embodiment of the present invention is illustrated. Licensing server 106 can provide a token 120 in response to a user's request to access content. Token 120 can be any identifier that, in one embodiment, contains usage rules for the electronic content. Token 120 can allow access to the electronic content based on the usage rules and does not need to look elsewhere for rules or authorization. Without a valid token 120, the user 10 cannot access the electronic content. Token 120 can be linked to the user device 102 and controls other tokens on the user device 102 (e.g. a master token) or can be an individual token 120 to each individual piece of electronic content. Token 120 can be delivered with the electronic content as it is being delivered to the user device 102.

Alternately, token 120 can be a pointer (e.g. a URL) to the licensing server 106. Once the user 10 requests access to the electronic content, the URL is activated and the licensing server 106 is queried to determine if the user is allowed access to the electronic content. In either embodiment, a token 120 is present with the electronic content on the user device.

In an embodiment, user 10 requests access to electronic content. The licensing server 106 determines if the user device 102 has a token 120. Either the token 120 can be passed up to the licensing server 106 at the time of the request or the licensing server can query the user device 102 to find the token 120. If the user device 102 does have a token 120, the user 10 is granted access to the electronic content. If the user device 102 does not have a token 120, the licensing server 106 checks the authorization database 112. If the unique ID 104 of the user device 102 matches the unique ID 104 of an authorized user device 110 in the authorization database 112, the user 10 is granted access to the electronic content. If the unique ID 104 does not match, license server 106 determines if the maximum number N of authorized user devices 110 has been reached. If the maximum number N has not been reached, user device 104 is added to the authorization database as an authorized user device 110 and the user 10 is granted access to the electronic content. If the maximum number N has been reached, alternately, the user's request can be denied or the user 10 can be prompted to de-authorize a user device 110 and authorize the requesting user device 104 so the user 10 can gain access to the electronic content.

Figure 4:
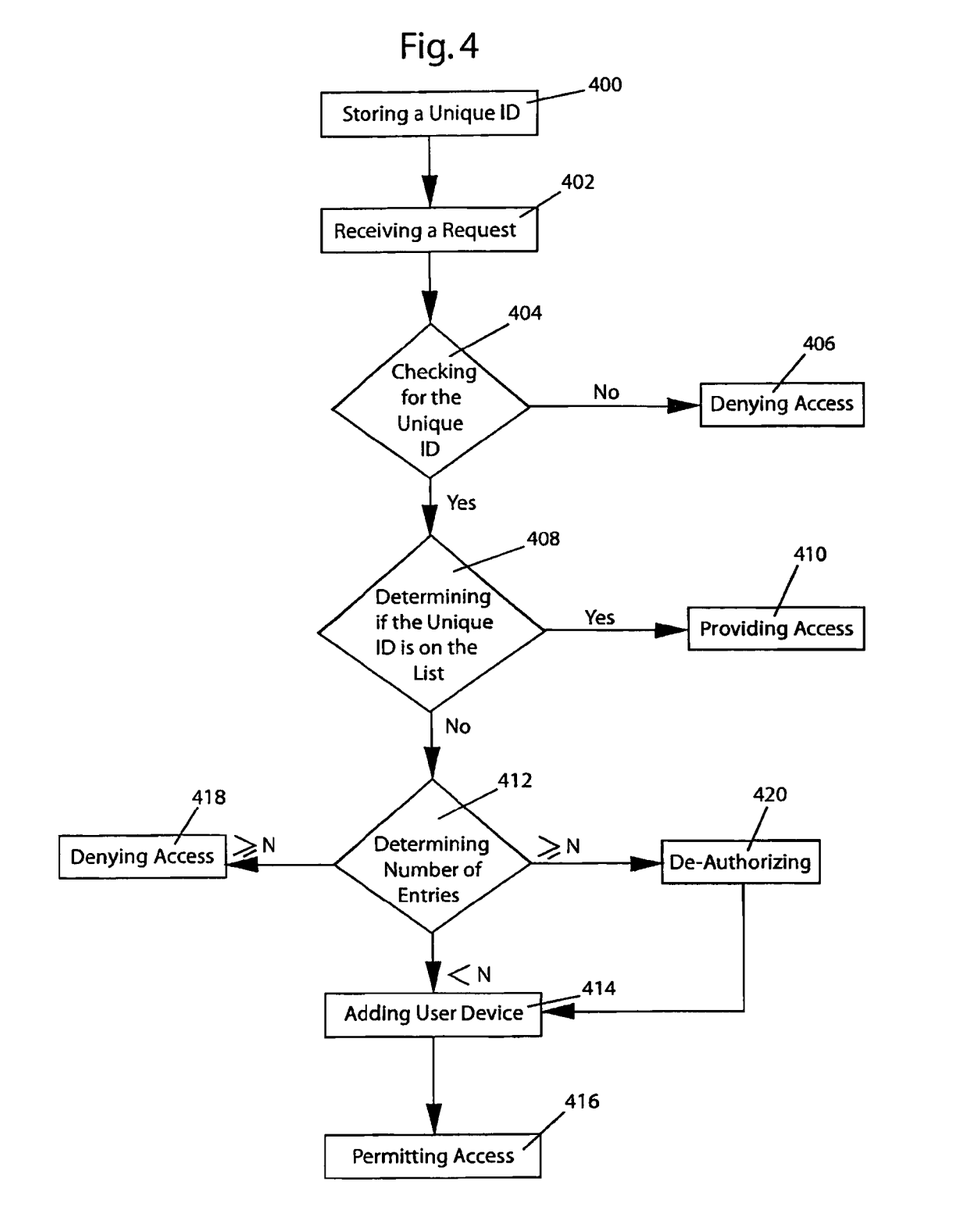
FIG. 4 is a flow chart of a method of the present invention.

Turning to FIG. 4, in a method for allowing access to electronic content, the unique ID 104 is stored in a cookie (step 400), as discussed above and the user 10 makes a request for electronic content and it is received by the provider (step 402). The license server 106 can check the cookie for the unique ID 104 (step 404), if the unique ID 104 is not in the cookie, the user 10 is denied access to the electronic content (step 406). If the unique ID 104 exists, the unique ID 104 is looked-up in the authorization database 112 (step 408) and, if unique ID 104 is in the authorization database 112, the user 10 is provided access to the electronic content (step 410). If the unique ID 104 is not in the authorization database 112, the number of entries in the authorization database 112 can be determined (step 412). If the number is less than the maximum number N, the user device 102 can be made an authorized user device 110 by adding the user device 102 to the authorization database 112 (step 414) and permitting the user 10 access to the electronic content (step 416). If the authorization database 112 already contains the maximum number N of authorized user devices 110, the user 10 can be denied access to the electronic content (step 418) or queried to de-authorize an authorized user device 110 (step 420).

Figure 5:
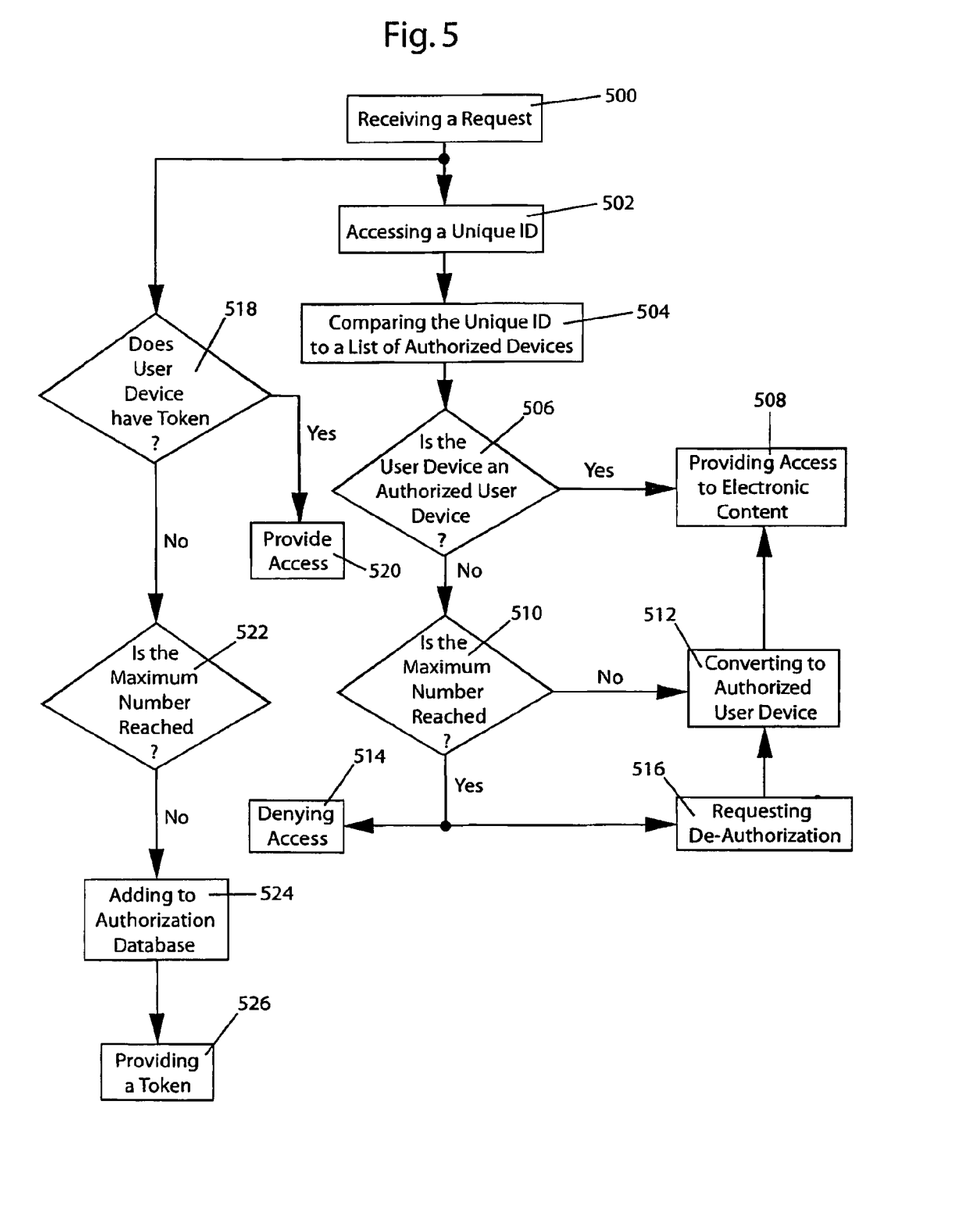
FIG. 5 is a flow chart of another embodiment of a method of the present invention.

Referring now to FIG. 5, another method for allowing access to electronic content includes receiving a request for access to the electronic content from a user device (step 500), accessing a unique ID of the user device (step 502), and comparing the unique ID to a list of authorized user devices (step 504). As above, the unique ID 104 can be stored on the user device 102 or the portal device 103. The list of authorized user devices can be authorization database 112 or any other method known in the art to compile and store data to be accessed.

The unique ID is used to determine if the user device is an authorized user device 110 (step 506) and if the user device 102 is the authorized user device 110, access is provided to the electronic content (step 508). If the user device 102 is not one of the authorized user devices 110, determining if a maximum number N of the authorized user devices is reached (step 510). The user device 102 is converted to an authorized user device 110, if the maximum number N is not reached (step 512) and access to the electronic content can be provided (step 508). If the maximum number N of authorized user devices 110 is reached, optionally denying the user device 102 access to the electronic content (step 514) or requesting de-authorization of one of the authorized user devices (step 516), converting the user device to an authorized user device 110 (step 512), and provide access to the electronic content (step 508).

In another embodiment of the above method, the system can determine if the user device has a token 120 (step 518) and provide access to the electronic content if the user device has the token (step 520). If the user device does not have a token, determining if a maximum number of authorized user devices is reached (step 522). If the maximum number N is not reached, the user device is added to an authorization database (step 524) and a token is provided to the user device (step 526).

In another embodiment, the present invention can be implemented as a stand alone DRM system or added to an existing DRM system. For example, the Microsoft® Janus® DRM system utilizes a token exchange system and a License Acquisition URL ("LAU"). The user 10 requests electronic content and the Janus® DRM system searches for a token 120. If the token 120 is present, the request is granted. If the token 120 is not present, the Janus® DRM system activates the LAU and is directed to the licensing server 106 to determine if the maximum number N of tokens 120 have been distributed. If the maximum number N is not met, the licensing server distributes a token 120 and increments a counter. The procedure repeats until the counter reaches the maximum number N, and then the next request is denied. The Janus® DRM system does not keep track of the user device 102, so all N tokens 120 can be distributed to the same user device 102 that is constantly "losing" its token 120 due to reformatting. The present invention adds the authorization database 112 to determine if user device 102 is an authorized user device 110. If the user device 102 is an authorized user device 110, the token 120 is distributed to the authorized user device 110, access to the electronic content is permitted, but the counter is not incremented.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

We claim:

1. A system for allowing access to electronic content, comprising:
   a user device configured to render the electronic content;
   a unique ID permanently stored on the user device and uniquely identifying the user device;
   a cookie storing the unique ID;
   a licensing server in communication with the user device and resolving requests for the electronic content; and
   an authorization database storing a list of authorized unique IDs;
   wherein the licensing server is configured to access the authorization database to determine whether the user device is an authorized user device based on the unique ID of the user device and to permit the fulfillment of the request for electronic content only to user devices that the authorization database indicates are authorized, and
   wherein the unique ID is encrypted.

2. The system of claim 1, further comprising:
   a last accessed user device; and
   a unique ID of the last accessed user device, permanently stored on the last accessed user device;
   wherein the unique ID of the last accessed user device is the only unique ID stored in the cookie.

3. The system of claim 1, wherein the unique ID includes a hardware identifier.

4. The system of claim 1, wherein the unique ID includes a canonical name.

5. The system of claim 1, wherein the licensing server determines whether the user device is an authorized user device by comparing the unique ID to the list of authorized unique IDs.

6. A method for allowing access to electronic content comprising:
   receiving a request for access to the electronic content from a user device;
   receiving a unique ID permanently stored on the user device and uniquely identifying the user device, wherein the unique ID is stored in a cookie and the unique ID is encrypted;
   comparing the unique ID to a list of authorized user devices;
   determining whether the user device is one of the authorized user devices using the unique ID;
   responsive to determining that the user device is not one of the authorized user devices, performing a determination, further comprising:
      determining whether a maximum number of the authorized user devices is reached;
      responsive to determining that the maximum number is not reached, converting the user device to the authorized user device;

responsive to determining that the maximum number is reached, optionally denying the user device access to the electronic content; and responsive to determining that the user device is the authorized user device, providing access to the electronic content.

7. The method of claim 6, further comprising the steps of:
determining whether the user device has a token;
providing access to the electronic content responsive to determining that the user device has the token;
responsive to determining that the user device does not have the token, determining whether the maximum number of authorized user devices is reached;
adding the user device to an authorization database responsive to determining that the maximum number is not reached; and
providing the token to the user device.

8. The method of claim 6, further comprising the step of storing the unique ID of a last accessed user device.

9. The method of claim 6, wherein the unique ID includes a hardware identifier.

10. The method of claim 6, wherein the unique ID includes a canonical name.

11. A method for allowing access to electronic content comprising:

receiving a request for access to the electronic content from a user device;

incident to the request, receiving a unique ID permanently stored on the user device and uniquely identifying the user device, wherein the unique ID is stored in a cookie and the unique ID is encrypted;

resolving the request for access to the electronic content by consulting an authorization database storing a list of authorized unique IDs to determine whether the user device is an authorized user device based on the received unique ID of the user device, conditioned on the authorization database indicating the user device is an authorized user device, indicating the request for electronic content should be fulfilled.

12. The method of claim 11, wherein the unique ID includes a hardware identifier.

13. The method of claim 11, wherein the unique ID includes a canonical name.

\* \* \* \* \*